Nov. 11, 1947.  J. B. MARCHESE  2,430,775
PUMP CONTROL
Filed Oct. 1, 1945  2 Sheets-Sheet 1
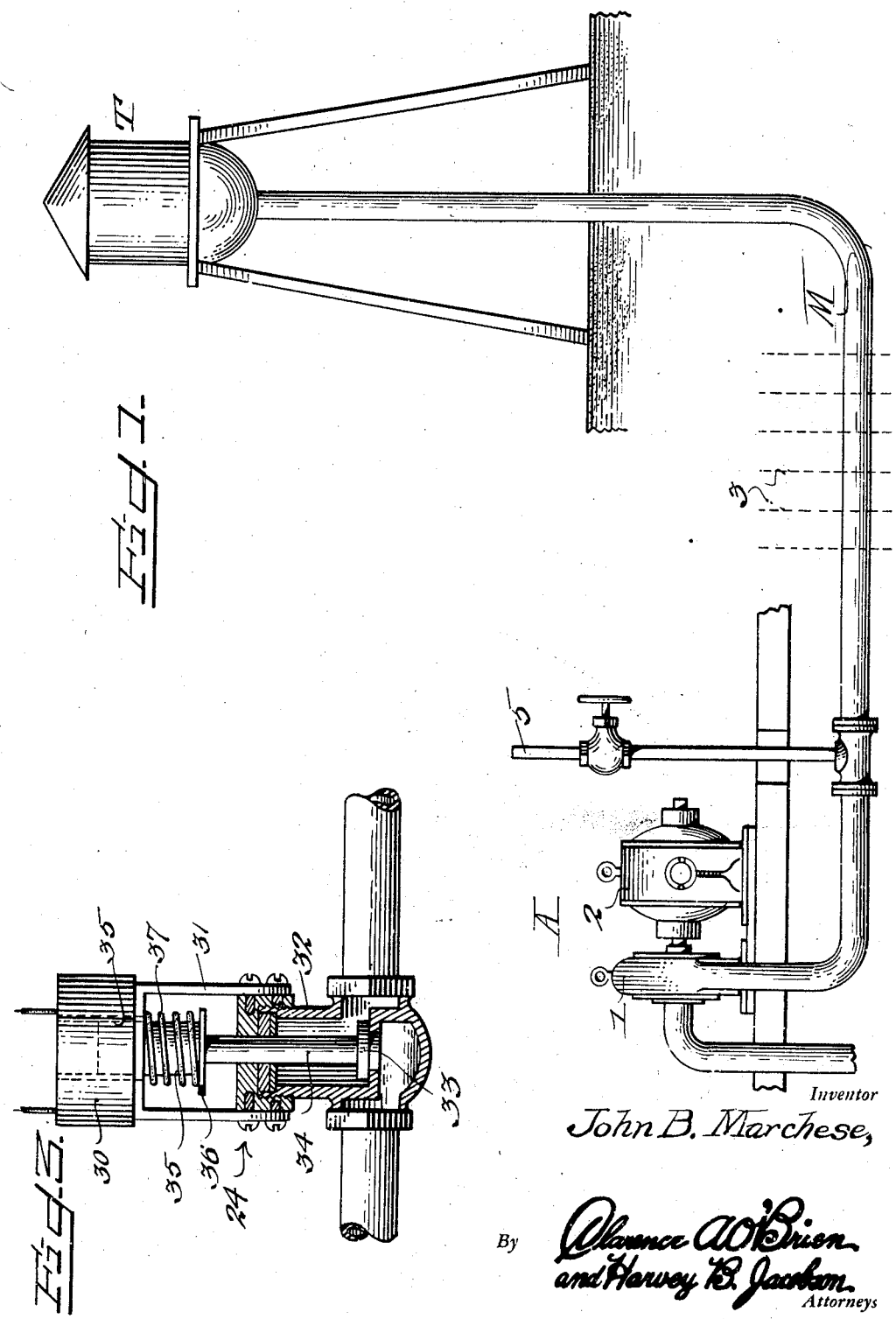
Inventor
John B. Marchese,
By Clarence A. O'Brien
and Harvey B. Jackson
Attorneys

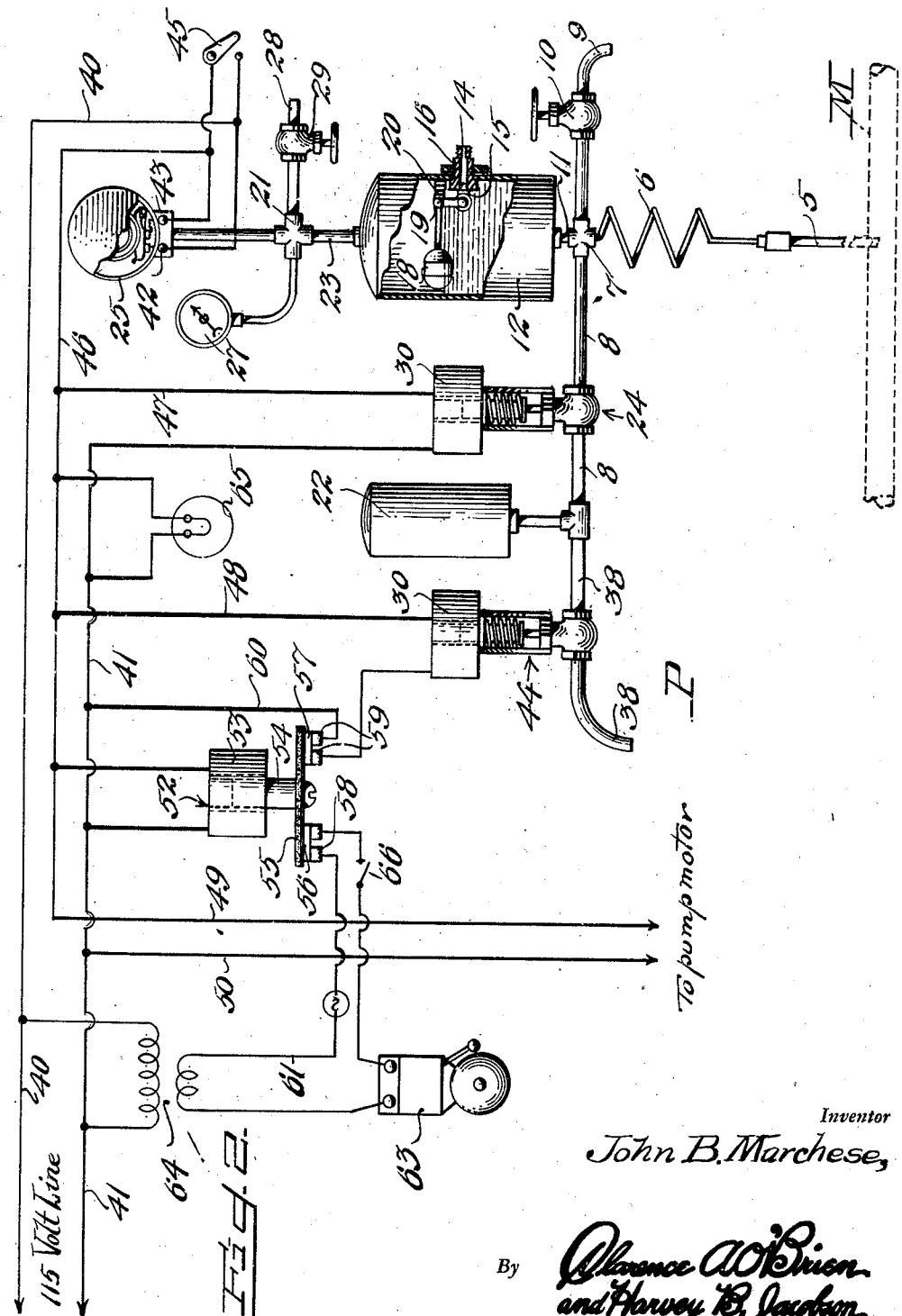

Patented Nov. 11, 1947

2,430,775

UNITED STATES PATENT OFFICE 2,430,775

PUMP CONTROL

John B. Marchese, Sharpsburg, Pa.

Application October 1, 1945, Serial No. 619,669

8 Claims. (Cl. 103—6)

1

This system relates to a regulation system for water distributing, pumping and supply installations and systems and it has for its principal object to eliminate the great difficulties arising in connection with the effective regulation of such systems and installations.

Water pumping, supply and distributing systems, as a rule, are provided with an elevated tank or tanks, which is or are kept filled by means of a pumping installation. This is done by keeping its water level above a certain minimum, and by operating pumps in the desired number and with the required output as soon as the water drops below this level. Floats and float operated switches in said tanks and an electric or hydraulic installation leading from the tank or tanks to the pumping house are, therefore, necessary.

The greatest difficulties in connection with such installations are experienced on account of the irregular but frequent and almost continuous pressure variations which are due to the outflow, consumption or discharge of water in large and small quantities. These pressure variations translate themselves into heavy pulsations almost continuously prevailing within the system. These pulsations are so strong that they will affect and almost permanently operate every regulation system thus introducing a source for aggravating these pulsations, by means of the sudden and frequent starting and stopping of the pumps.

Another difficulty resides in the float switches which cause permanent trouble during the winter months.

Various means for counteracting or slowing down the effects of the pulsations have been proposed, but systems of this type have to be simple to be effective and these means as a rule did not fulfill the condition of leaving the system more or less in its original state. Moreover in certain systems the elevated tanks are located at considerable distances from the pumping houses or stations, and installations comprising multi-conductor cables and other communications between these two units are necessary which may be very expensive.

The present invention eliminates the difficulties encountered by providing a special small local pressure system which controls the source of power for the regulating members and from which all the pulsations due to temporary and transient causes have been eliminated. This system will, therefore, mainly react on a definitive and resultant lowering of the pressure due to a dropping of the water level in the elevated tanks

2 below a certain limit and will regulate merely when the resultant downward trend of the pressure requires regulation and actuation of the pump.

The special local pressure system according to the invention comprises a system of small tanks connected with the supply or feed line leading from the pumping station to the elevated tanks by means of a capillary tube. It moreover comprises a pressure switch, closing a circuit when the pressure drops below a certain limit, a number of solenoid valves, cooperating with the tank system and a magnetic or solenoid switch operating the pump motor. It may moreover comprise alarm and indicator means for the information of the attending personnel. The tank system, whose pressure is regulated by the solenoid valves, and which is inserted between the capillary tube connecting it with the main pipe and the pressure switch, forms the pulsation eliminator which eliminates reaction to temporary or transient pressure drops, even if going markedly below the limits and causes reaction merely to the resultant pressure variations or to the downward trend of the pressure as expressed without regard to the individual or transient pressure variations.

The invention will be described more fully with reference to the acompanying drawings which illustrate one modification of the invention. It is, however, to be understood that the invention although described with reference to said modification is not confined to the details thereof which are only mentioned by way of example. As will be clear to any expert skilled in this art, the specification and drawings clearly describe general viewpoints and principles enabling said experts to construct a number of embodiments of the invention and foreshadowing such further modifications and these further embodiments of the invention when coming within the ambit of the annexed claims do not therefore constitute departures from, but are a part of the invention claimed.

In the accompanying drawings:

Figure 1 is diagrammatic view of a water supply and distribution system showing the main units thereof and the location of the connection of the general system with the regulating system according to the invention.

Figure 2 is a diagrammatic view of the special regulating system.

Figure 3 is an elevational partly sectional view of one of the solenoid valves.

The general water distribution or water supply system comprises a pumping station A with a pump or pumps 1, driven by a motor or motors 2, the water mains or supply pipe M and the elevated tank or tanks T. It is to be understood that the character or nature of the water supply or distribution system is not of much importance, as regards its connection with the present invention. The system may be that of an apartment house, supplying a large number or outlets within a building or the water supply system of a township or municipality supplying a large number of individual consumers some of which may be pumping stations.

These outlets or consumers are diagrammatically indicated at 3 in Figure 1 by means of dotted lines. The elevated tank T is of the conventional type constructed in accordance with the system: it should be kept filled for supply or distribution purposes and the sinking of the water level in the tank below a certain minimum will have the consequence of starting or accelerating the pump which starts to supply or increase the supply to the tank.

Preferably near the pumping station A, or on any other convenient place along the main supply pipe M, the pipe 5 leading to the special pressure system P used according to this invention is branched off. This branch pipe is broken off in Figure 1 and connects with pipe 5 in Figure 2, which is supposed to be a continuation of this pipe, as indicated by showing the main pipe M in dotted lines.

This branch pipe leads to a coiled capillary tube 6 which in its turn is joined to a pipe connector 7 leading on one side to the pipe 8 of the regulating tank system, on the other side to an outlet 9 controlled by a manually operated valve 10. Member 7 is moreover connected by a short pipe 11 to the main regulating tank 12.

This tank 12 is a closed container provided with 3 connections. In addition to the connection 11 already mentioned a float controlled connection 14 is arranged, which is closed by conical valve 15 located at the end of the bore of a cylindrical nipple 16 screwed into the side wall of the tank 12. The nipple 16 is provided with a screw threaded end into which an air pipe (not shown) may be screwed. The conical valve 15 is operated by the float 18 which is fulcrumed at 19 on a bracket 20 fixed to the tank.

From the top part or cover of the tank 12 a pipe 23 containing a connector piece 21 leads to a pressure switch 25. This switch is known in itself and is a standard equipment used in electric supervision arrangements. It is, therefore, not described in detail as its construction is known and is immaterial from the viewpoint of this specification. In the drawing it is shown as being of the Bourdon tube type with a closed flexible Bourdon manometric tube operating the spring contact of a mercury switch. The said switch 25 has the function to close a contact when the pressure to which it is subjected drops below a certain value. As it is connected with the main regulating tank 12 by pipe 23 it is the pressure of said tank which will operate the switch.

The connector piece 21 is moreover connected with a manometric device 27 indicating the pressure prevailing in the system to the attendant and with an air pipe 28 which may be closed by a hand-operated valve 29.

The pipe 8 of the regulating system connects the main regulating tank 12 with an auxiliary regulating tank 22, a solenoid valve 24 being inserted into said connection. The construction of the solenoid valve does not form part of the invention. It consists, as shown in Figure 3, of a solenoid coil 30 mounted on a frame 31 which in its turn is fixed to a valve casing 32. The flow controlling valve 33 is mounted on a stem 34 which carries the plunger or solenoid core 35. A spring retaining disc 36 is mounted on the stem and a pressure spring 37 is inserted between the frame and the disc keeping the valve in its closed position as long as the coil is not energized.

The branch 38 of the pipe 8 which leads away from the auxiliary tank 22 is provided with a second solenoid valve 44 of the same type.

The pressure switch 25 is connected with one of the supply mains 40, such as the 115 volt A. C. lines of the local network, which is connected with the terminal 42, leading to the switch contacts. The other terminal 43 leads to the supply conductor 46.

It is advisable to connect a manual switch 45 in parallel to the pressure switch, which is kept open as a rule, but which permits the attendant to operate the system in the event of repair or of sluggish or irregular working due to defects or abnormal pressure conditions.

From conductor 46 the two solenoid valves 24 and 44 are supplied with current by means of conductors 47 and 48, respectively. Moreover conductor 46 is directly connected with the pump motor 2 (Figure 1) by means of conductor 49, its return conductor 50 being directly connected with the second line conductor 41.

Conductor 46 is moreover connected with a magnetic or solenoid switch 52 which consists of a solenoid 53 acting on a core or plunger 54 provided with a contact arm 55 of insulating material. This arm is provided with contact pieces 56, 57 respectively each of which bridges the contacts 58, 59 respectively of a circuit 60 or 61 respectively.

As seen these contacts are bridged when the magnet or solenoid switch 52 is de-energized, while these contacts are opened when the switch 52 is energized.

Of the two circuits controlled by said switch circuit 60 is the energizing circuit of solenoid valve 44, while circuit 61 is the circuit of an alarm bell 63 connected with the mains 40, 41 by means of a transformer 64. This circuit may contain a manually operated switch 66. Another indicator, preferably an indicator lamp 65, is connected with conductor 46 controlled by the pressure switch 25 and acts as an annunciator showing when the pressure switch is operated.

The operation will be quite clear from the diagram if the following points are considered:

The capillary coil 6 excludes from the system all those changes in pressure which are more or less sudden, the shocks being absorbed by the coil.

In the tank 12 air is permanently maintained which is compressed when water is pressed into the tank. The air is trapped in the tank at atmospheric pressure and, when the tank has been emptied through pipe 9 and valve 10, a process which has to be performed from time to time for clearing the tank of sediments, air will penetrate automatically into it. However, if water is in the tank, air may be pressed in by means of a hand pump connected with pipe 28 controlled by valve 29

If the system is such that the pauses between evacuations of the tank are long a fully automatic air supply may be desirable. This is obtained by means of the float 18 and the nipple 16 which is joined to a supply of air of a pressure a little higher than the pressure in the tank. This supply of air is then controlled by the float 18 which opens the valve as soon as a certain level within the tank has been reached. Compressed air will then be admitted and will press the level down until the float closes again. The volume and pressure of the air in the tank is thus kept at a constant value.

The operation under these conditions is approximately the following. When the water level in the elevated tank T is lowered and in the end reaches a certain predetermined level, the pressure switch 25 closes its contacts, whereby solenoid valve 24 is energized.

Moreover the indicator light 65 is lighted showing to the attendant that the switch has operated. If the pump motor 2 is directly connected with the switch it will also start operation.

When solenoid valve 24 is opened water from the main regulating tank 12 is allowed to flow into the auxiliary tank 22 causing a sudden drop of pressure in the tank 12. This drop will allow the pressure switch to fall into and to remain in its full closed position, and it will also assist in keeping the pressure down in the following short period in which the pump starts to work and increases the pressure in the main pipe at least temporarily. All these temporary variations have, therefore, no influence on the switch 25 which stays in its position until the elevated tank is full.

At the same time the magnet or solenoid switch 52 is energized and opens the circuits 60 and 61. The solenoid valve 44 is thereby closed and the bell circuit is interrupted.

When the tank is full again the pressure switch 25 will open. The indicator light 65 disappears and the solenoid valve 24 is closed. The pump 2 ceases to operate and the magnetic switch is deenergized. Circuits 60 and 61 are closed, the solenoid valve 44 opens and the auxiliary tank 22 is emptied and is thus ready for a further operation. The bell rings indicating the fact that the tank has been filled. The attendant may cut out the circuit if he does not want a continuous signal, by opening the manually operated switch 66.

The solenoid valves, as will be clear, are operating only alternatively.

As will be seen from the above the regulating system operates without electric or other connection with the elevated tank. In fact, the regulating arrangement is best arranged in the pump room and is neither connected with the mains nor with the elevated tank. Once the regulating system is operating it accentuates the existing pressure tendency and therefore brings it out of the range of temporary counter influences which would be able to reverse the operation. By virtue of the capillary coil and the tank system in series it eliminates all the various rapid pressure changes from becoming active and from influencing the regulation.

It will be clear that the construction of the details plays only a minor part and that it is the general arrangement and cooperation of the units which constitute the invention.

I claim:

1. A pressure pulsation and shock reducing and eliminating system for water supply and distributing installations with a pump station containing pumps and electric pump driving motors, an elevated tank, and distribution and supply pipes connected with said tank and pumps, said system comprising a pressure transmission pipe connected with the water supply and distributing pipe leading from the pump, a capillary coil arranged in said pressure transmission pipe, a main regulating tank partly filled with air, connected with said capillary coil, means for maintaining an air pressure in said tank which is above a predetermined value, an auxiliary tank, connected with the main regulating tank, a pressure switch influenced by the air pressure in the last mentioned tank and an operative circuit, controlled by said pressure switch for controlling the electric pump motors.

2. A pressure pulsation and shock reducing and eliminating system for water supply and distributing installations with a pump station containing pumps and electric pump driving motors, an elevated tank, and distribution and supply pipes connected with said tank and pumps, said system comprising a pressure transmission pipe connected with the water supply and distributing pipe leading from the pump, a capillary coil arranged in said pressure transmission pipe, a main regulating tank partly filled with air, connected with said capillary coil, means for maintaining an air pressure in said tank which is above a predetermined value, an auxiliary tank, a connection between said main regulating tank and said auxiliary tank, an electrically controlled valve in said connection, a pressure switch influenced by the air pressure in the main regulating tank, an operative circuit controlled by said pressure switch and means for controlling the electric pump motors and the said electrically controlled valve.

3. A pressure pulsation and shock reducing and eliminating system for water supply and distributing installations with a pump station containing pumps and electric pump driving motors, an elevated tank, and distribution and supply pipes connected with said tank and pumps, said system comprising a pressure transmission pipe connected with the water supply and distributing pipe leading from the pump, a capillary coil arranged in said pressure transmission pipe, a main regulating tank partly filled with air, connected with said capillary coil, means for maintaining an air pressure in said tank which is above a predetermined value, an auxiliary tank, a connection between said main regulating tank and said auxiliary tank, an electrically controlled valve in said connection, a pressure switch influenced by the air pressure in the main regulating tank, operative circuits connected with and controlled by said pressure switch, a magnetic switch in said operative circuit, an operative circuit for the pump motor connected with the above named operative circuits, an operative circuit for the electrically controlled valve associated with said operative circuit, an ennunciator device and an annunicator circuit controlled by said magnetic switch.

4. In a system as claimed in claim 4, a second electrically controlled valve controlling the outlet of the auxiliary tank and an operative circuit for the same controlled by the magnetic switch.

5. A pulsation and shock reducing and absorbing system for water supply and distributing installations with a pump, an elevated tank and a pipe between them, said system comprising a pressure switch, means for operating the same, including a pressure pipe, leading from the pipe connecting the pump and the elevated tank, means for controlling the operation of the pump by the pressure switch, and means for protecting the pressure switch against temporary pressure variations, said means including a capillary coil, inserted into said pressure pipe, a main regulating tank partly filled with air, a connection between the air filled portion of said tank and said pressure switch, float operated means for keeping the tank filled with water under a predetermined air pressure, an auxiliary regulating tank connected with the main regulating tank and means for controlling the outflow of water from said main regulating tank, operated by said pressure switch.

6. A pulsation and shock reducing and absorbing system for water supply and distributing installations with a pump, an elevated tank and a pipe between them, said system comprising a pressure switch, means for operating the same, including a pressure pipe, leading from the pipe connecting the pump and the elevated tank, means for controlling the operation of the pump by the pressure switch, and means for protecting the pressure switch against temporary pressure variations, said means including a capillary coil, inserted into said pressure pipe, a main regulating tank partly filled with air, a connection between the air filled portion of said tank and said pressure switch, means for keeping the main regulating tank under a predetermined air pressure, said means including an air supply pipe and a float operated valve, controlling said pipe, a discharge pipe connected with said main regulating tank, means for controlling the outflow of water from said tank through said discharge pipe, said means being controlled by the pressure switch, an auxiliary tank connected with said discharge pipe, and electrically operated valve means, controlled by said pressure switch for regulating the discharge of the auxiliary tank.

7. A pulsation and shock reducing and absorbing system for water supply and distributing installations with a pump, an elevated tank and a pipe between them, said system comprising a pressure switch, means for operating the same, including a pressure pipe, leading from the pipe connecting the pump and the elevated tank, means for controlling the operation of the pump by the pressure switch, and means for protecting the pressure switch against temporary pressure variations, said means including a capillary coil, inserted into said pressure pipe, a main regulating tank partly filled with air, a connection between the air filled portion of said tank and said pressure switch, an auxiliary tank, a discharge pipe for the main tank and auxiliary tank, a branch connection from the same leading to the auxiliary tank, and pressure switch controlled means for controlling the discharge of water through said discharge pipe on both sides of said branch pipe leading to the auxiliary tank.

8. A pulsation and shock reducing and absorbing system for water supply and distributing installations with a pump, an elevated tank and a pipe between them, said system comprising a pressure switch provided with electrical contacts, closed by said pressure switch at a predetermined pressure value, means for operating said pressure switch including a main regulating tank partly filled with air and partly with water, means for keeping the air pressure in said main regulating tank above a predetermined value, said means including a supply pipe for air under pressure, leading to said tank, a float within said tank and a float operated valve for opening and closing said air supply pipe, a discharge pipe connected with the water filled portion of the main regulating tank, an auxiliary regulating tank, and a connecting branch pipe for connecting the same with the discharge pipe, electrically operated valve means between said main and auxiliary tank in said discharge pipe and further electrically operated valve means in said discharge pipe between said branch pipe and the discharge end of said discharge pipe, electric operative circuits for each of said electrically controlled valves, an electric supply circuit, and an operating circuit, the connection between the former and the latter being controlled by the contacts of the pressure switch, said operating circuit being provided with branches including the electric motors of the pump and the electrically controlled valve between the main and the auxiliary tank, a magnetic switch directly connected with said operating circuit, said switch being provided with contacts closed during de-energization of the switch, an alarm bell and an alarm bell supply circuit, and an operating circuit for the second electrically controlled valve, both last named circuits being controlled by the contacts of the magnetic switch.

JOHN B. MARCHESE.

REFERENCES CITED

The following references are of record in the file of this patent:

UNITED STATES PATENTS

| Number | Name | Date |
| --- | --- | --- |
| 1,541,112 | Buvinger | June 9, 1925 |
| 1,913,557 | Millar | June 13, 1933 |
| 1,941,683 | Hamilton | Jan. 2, 1934 |
| 1,972,968 | Gardeen | Sept. 11, 1934 |
| 2,275,066 | Otterbourg | Mar. 3, 1942 |
| 2,277,977 | Hesse | Mar. 31, 942 |